Figure 4:
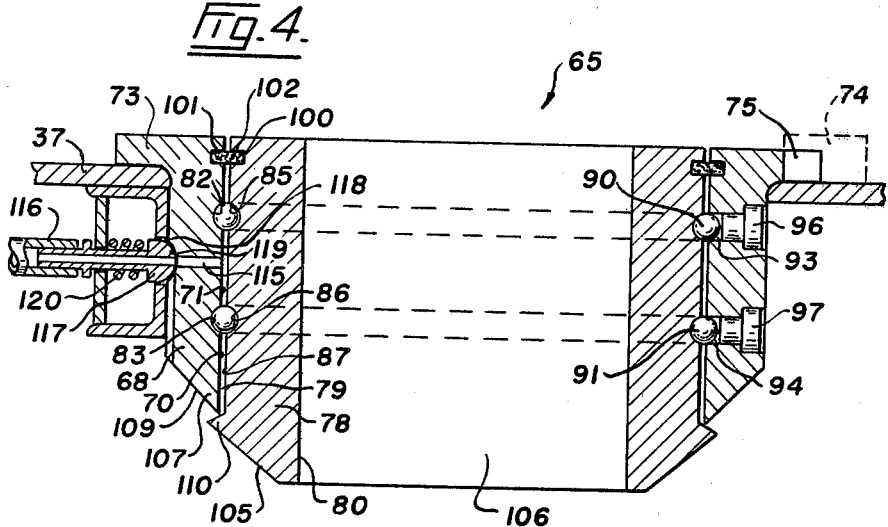

United States Patent [19]
McLean

[11] 3,951,470
[45] Apr. 20, 1976

[54] DRILL STEEL IDLER GUIDE

[75] Inventor: Donald F. McLean, Princeton, Canada

[73] Assignee: Bralorne Resources Limited, Calgary, Canada

[22] Filed: May 1, 1975

[21] Appl. No.: 573,660

Related U.S. Application Data

[63] Continuation of Ser. No. 390,951, Aug. 23, 1973, abandoned.

[52] U.S. Cl............................ 308/3.9; 175/220; 308/4 A
[51] Int. Cl.² ........................................ F16C 21/00
[58] Field of Search............ 308/3.9, 4 R, 4 A, 36.3, 308/187.1; 175/220

[56] References Cited
UNITED STATES PATENTS

| | | |
|---|---|---|
| 2,122,150 | 6/1938 | Lippold.................... 308/3.9 |
| 2,248,160 | 7/1941 | Crawford................... 308/4 A |
| 3,301,102 | 1/1967 | Delara..................... 308/3.9 |
| 3,833,070 | 9/1974 | Anderson................... 308/4 R |

*Primary Examiner*—M. H. Wood, Jr.
*Assistant Examiner*—Gene A. Church
*Attorney, Agent, or Firm*—H. Wayne Rock

[57] ABSTRACT

A drill steel idler guide having an internal sleeve rotatably supported in a base by means of ball bearings fitting in opposed annular grooves in the sleeve and base, said sleeve having a bore through which a drill steel can slidably fit. Means is provided for directing pressure air through the base and into an annular space between the base and the sleeve.

3 Claims, 5 Drawing Figures

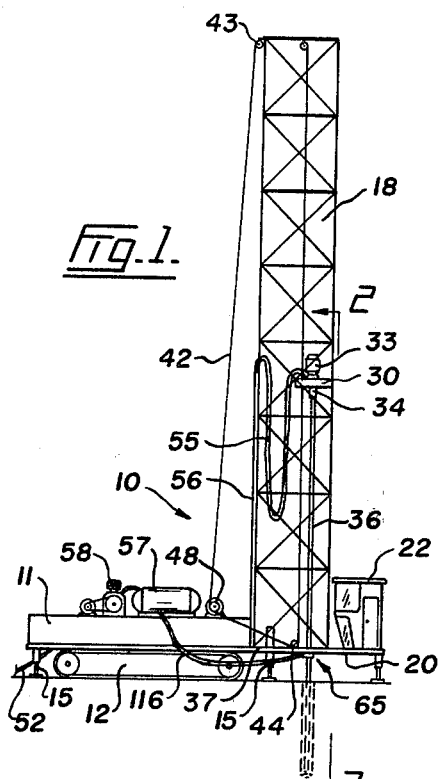
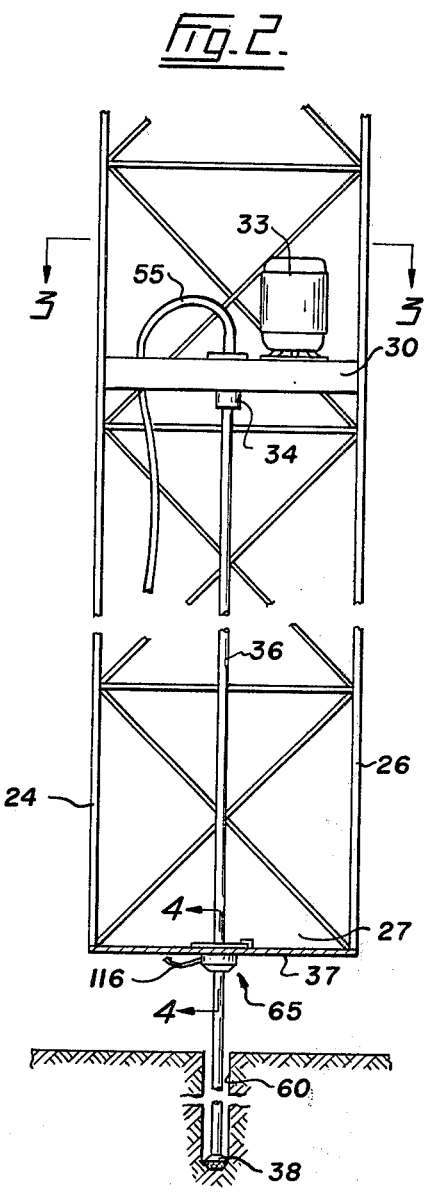
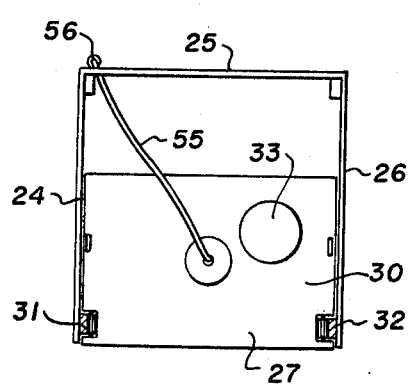

DRILL STEEL IDLER GUIDE

This is a continuation, of application Ser. No. 390,951 filed: Aug. 23, 1973 now abandoned.

This invention relates to a drill steel idler guide for top drive rotary drills.

The prior art includes top drive rotary drills for drilling vertical holes for different purposes. For example, equipment of this type is used for drilling blast holes in surface mining operations. A drill arrangement for this purpose usually is in the form of a self-propelled unit having a mast or tower, and power means for rotating a drill steel and feeding it into the ground. The drill steel has a suitable rotary cutting bit on its lower end, such as a tricone rotary bit.

In the standard top drive rotary drills, the drill steel extends downwardly from a top drive unit and through a fixed bushing into the ground. The purpose of the bushing is to keep the steel as straight as possible. When the steel starts to run off laterally, as it frequently does, it presses against the bushing, and this makes it harder to turn the steel, uses more power, and wears both the bushing and the steel. In addition to this, dirt and cuttings which are blown up out of the hole being drilled, lodge between the steel and the bushing so that there is a scrubbing or sanding action within the bushing. With one commonly used top drive rotary drill, the average for the bushing is about 50,000 feet of hole drilled, after which the bushing has to be changed.

The present invention is a definite improvement over the prior or conventional bushings. The invention includes an idler guide through which the drill steel extends in place of the conventional bushing. When the steel runs off laterally, the resulting load is taken by suitable bearings, and any dirt or cuttings that may get between the steel and the guide do not scrub against the metal, but are crushed by the steel. This idler guide prolongs the life of a drill steel by at least 3 times. For example, in one operation in which the present idler guide is being used, the bushing has drilled 141,000 feet of hole, before being replaced.

An idler guide in accordance with the present invention and which produces these desirable results comprises a base having a passage of circular crosssection extending therethrough and adapted to be carried by a support, this passage being defined by an inner annular surface. An internal sleeve is rotatably mounted within the base passage and is spaced slightly from the annular surface thereof to form a small annular clearance space therebetween. Opposed annular grooves are formed in the inner annular surface of the base and an outer surface of the sleeve, and rotatable bearings such as ball bearings are fitted in these grooves and span the annular space and support the sleeve within the base. This sleeve has an axial bore therethrough for unimpeded rotation and sliding passage of a drill steel, and the sleeve rotates with the drill steel when the latter tends to run off laterally during drilling operation, so that said bearings take the load. It is preferable to include a deflecting surface on the lower end of the sleeve which projects axially beyond the adjacent end of the base for deflecting air and particles therein away from the annular space between the sleeve and the base. It is further desirable to provide means for directing pressure air through the base and into this annular space to maintain a pressure therein above atmospheric pressure to help keep particles out of the space.

This idler guide can also be defined by a base having a passage of circular cross-section extending therethrough and defined by a cylindrical wall and adapted to be carried by a support, an internal sleeve rotatably supported within the base circular passage and slightly spaced from the defining wall thereof to form a small annular clearance space therebetween, said sleeve having a bore through which a drill steel can slidably fit, and means for preventing dirt and particles from entering the annular space.

Figure 5:
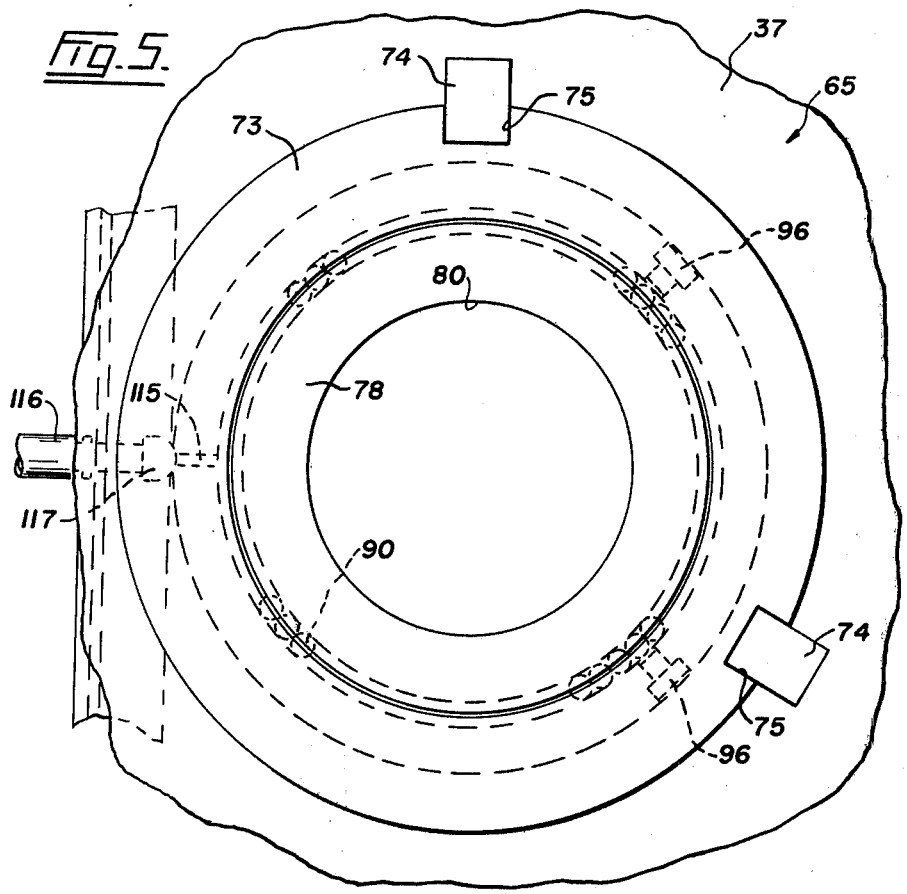

An example of the present invention is illustrated in the accompanying drawings, in which FIG. 1 is a reduced and diagrammatic side elevation of a top drive rotary drill in which the present invention is incorporated, FIG. 2 is an enlarged vertical section taken from the line 2—2 of FIG. 1, FIG. 3 is a cross section taken on the line 3—3 of FIG. 2, FIG. 4 is an enlarged vertical fragmentary section taken on the line 4—4 of FIG. 2 and through the idler guide, and FIG. 5 is a plan view of the idler guide shown in FIG. 4.

Referring to the drawings, 10 is a top drive rotary drill unit including a body 11 mounted on a suitable support, such as a driven track arrangement 12 by means of which the unit is moved by a source of power, such as an internal combustion engine or an electric motor, mounted within body 11 and not shown. When the unit is ready to operate, a plurality of levelling jacks 15 are shifted downwardly from the unit and against the ground.

A tower or mast 18 is mounted on and projects upwardly from body 10 at one end thereof, said tower having a horizontal platform 20 at the bottom thereof and spaced above the ground. A cab 22 is provided on the platform outside the tower for an operator.

Tower 18 has three webbed sides 24, 25 and 26, and an open side 27. A carriage 30 spans the open side 27 of the tower and rides on tracks 31 and 32 extending vertically along opposite sides of the open side 27. In this example, carriage 30 is in the form of a drive box carrying the transmission which is connected between an electric D.C. motor 33 and a coupling 34 into which the upper end of a drill steel 36 can be threaded. This drill steel extends downwardly through a platform or deck 37, and has a rotary bit 38 on its lower end.

Carriage 30 is raised and lowered in any suitable manner, such as by means of a chain 42 which is connected at opposite ends to the carriage and extends around sprockets 43 and 44 mounted at the top and bottom, respectively, of the tower. This chain is moved in any desired manner, such as by an electric motor 47 through a sprocket 48 around which the chain travels.

Electric power for operating the various components of unit 10 may be supplied from an outside source through a power cable 52 which extends to and drags behind the unit, or the power may be supplied by a suitable generator powered by an internal combustion engine mounted in body 10. Alternatively to this, all the power required for operating the components of unit 10 may be supplied by one or more internal combustion engines, not shown, mounted in body 10. This body also includes weights, not shown, in order to prevent the unit from tipping.

During operation of unit 10, a suitable fluid, such as air, is directed into the hole in order to clear the cuttings away from rotary bit 38. Drill steel 36 is made hollow for this purpose, and air is directed into the upper end thereof by a hose 55 which extends into carriage 30 and is connected to the upper end of the drill steel or rod in any convenient manner. As this is standard equipment, the connection is not shown or described herein. The opposite end of hose 55 is connected to a pipe 56 which extends part way up the side 24 of tower 18. The opposite end of pipe 56 is connected by a suitable hose and valving to a pressure tank 57 to which air is supplied under pressure by a motor-driven compressor 58.

When apparatus 10 is in operation, pressure air is directed by hose 55 into the upper end of drill steel 36, and this air is discharged around bit 38 to blow cuttings away therefrom and upwardly through hole 60 which is being formed by the bit.

All of the equipment described in detail so far is standard equipment in a top drive rotary drill, and this may be varied as desired.

An idler guide 65 in accordance with this invention is provided in platform or deck 37 and positioned so that drill steel 36 passes therethrough. Guide 65 is illustrated in detail in FIGS. 4 and 5.

Guide 65 includes a base 68 which is carried by deck 37. This base has a passage 70 of circular cross-section extending therethrough, said passage being defined by an inner cylindrical surface 71. In this example, base 68 is in the form of an outer sleeve having a flange 73 at its upper end resting upon deck 37. The base and flange are prevented from rotating by stops 74 removably connected to deck 37 and fitting into notches 75 formed in flange 73.

An internal sleeve 78 rotatably fits within base passage 70 and is spaced slightly from cylindrical surface 71 to form a small annular clearance space 79 therebetween. This sleeve is formed with a bore 80 extending therethrough. Two or more grooves 82 and 83 are formed in surface 71 of base passage 70, and are opposed by two or more annular grooves 85 and 86 formed in the outer surface 87 of sleeve 78. The opposed grooves 82, 85 and 83, 86 are filled with ball bearings 90 and 91 which fit in these grooves and span the space 79 so that sleeve 78 is supported by these ball bearings.

The ball bearings 90 and 91 may be inserted into their respective grooves in any desired manner. In this example, the balls are inserted into the grooves through passages 93 and 94 drilled through base 68 and opening into grooves 85 and 86, respectively. Once the balls have been dropped into their grooves, openings 93 and 94 are closed by suitable plugs 96 and 97.

It is desirable to provide a seal between base 68 and sleeve 78 near the top thereof. For this purpose, a sealing ring 100 is fitted into opposed grooves 101 and 102 formed in the base and the sleeve near the upper ends thereof.

As cuttings are blown upwardly out of hole 60 during operation of the drill, it is desirable to prevent these cuttings from entering space 79 between the base and the sleeve. Suitable deflecting means is provided for this purpose, and in this example, the deflecting means consists of a deflecting surface 105 formed on the lower end 106 of sleeve 78 which projects below the adjacent end 107 of base 68. Surface 105 is inclined upwardly and outwardly, and an annular projection or rib 110 radiates from the sleeve and extends over space 79 and the adjacent end of the base. The inclined deflecting surface 105 extends into and across projection 110, as clearly shown in FIG. 4. If desired, the lower end 107 may be formed with an upwardly and outwardly inclined surface 109. With this arrangement, cuttings and dirt which are blown upwardly towards idler guide 65 and deck 38 are directed laterally by the inclined deflecting surface 105 so that they do not enter space 79 between the base and the inner sleeve.

Suitable means is provided for directing pressure air into clearance space 79 to keep cuttings and dirt out of said space, either in addition to or in place of the deflecting means described above. In this example, a passage extends radially through base 68 and opens into space 79, and pressure air is directed to this passage in any convenient way, such as by a hose 116 connected to a fitting 117 which extends through a hole 118 in a part of deck structure 37 and into a concave depression 119 formed in the side of sleeve 78. The curved end of this fitting is resiliently held in depression 119 by a tension spring 120.

In order to give some idea of the size of the rotary drill unit, the following particulars are given of a standard unit by way of example:

Body 11 - 22 ft. wide, 46 ft. long
Tower 18 - 75 ft. high, with 10 ft. wide sides
Drill steel 30 - 50 ft. long, 8⅝ in. diameter
Deck 37 - 4 ft. above ground
Drill steel speed - 40 to 60 rpm.
Motor 32 - D.C. electric
Motor 47 - A.C. electric.

When drill unit 10 is in operation, a drill steel 36 extending through sleeve 78 of idler guide 65 is gripped by coupling 34 and rotated by motor 33 through the reduction gearing in carriage 30. As the hole 60 is formed in the ground or rock, carriage 30 is moved downwardly through chain 42. Drill steel 36 is slidably and unimpeded received in bore 80 of sleeve 78 so that the latter can turn with the steel. When the drill steel tends to run off laterally, as it frequently does because of different rock conditions at the bottom of the hole being drilled, this movement is resisted by sleeve 78, and as this sleeve is totally supported by ball bearings 90 and 91, said bearings take the load so that the steel and the sleeve are subjected to very little wear. As the drilling goes on, air is blown down through the drill steel into the bottom of the hole, and cuttings and earth are blown upwardly through the hole towards platform 37. This air and cuttings is directed by deflecting surface 105 at the lower end of the sleeve radially away from guide 65 so that this surface and annular projection 110 prevent the cuttings and dirt from entering clearance space 79 between base 68 and sleeve 78. Sealing ring 100 prevents dirt from entering space 79 from the top of the guide.

Pressure air is directed through hose 116 and base passage 115 into space 79, and this keeps the pressure in this space a little above atmospheric pressure thereby helping to keep air and dirt out of this space. If any foreign material gets into bore 80, it is crushed between the steel and the sleeve and so is rendered harmless. This happens because the sleeve is rotating with the steel and consequently there is very little rubbing between the adjacent surfaces. When the drill steel rotates in a bushing of the prior art, any particles between the steel and the bushing abrade the adjacent surfaces since there is relative motion therebetween.

From the above it will be seen that guide 65 is very simple in construction, and yet it very greatly reduces the wear on the drill steel, and it reduces the amount of power required to rotate it since the steel is guided by bearings 90 and 91 when the drill steel tends to run off laterally.

I claim:

1. In combination with a top drive rotary drill steel for use in drilling mine shafts or blast holes in earth formations, an idler guide comprising a base having a passage of circular cross-section extending therethrough and adapted to be carried by a support, said passage being defined by an inner cylindrical surface, an internal sleeve rotatably mounted within said base passage and spaced slightly from said cylindrical surface to form a small annular clearance space therebetween, opposed annular grooves in the inner cylindrical surface of the base and an outer surface of the sleeve, and rotatable bearings in said grooves spanning said annular space and supporting the sleeve within the base, said sleeve having an axial bore therethrough for unimpeded rotation and sliding passage of said drill steel therein during a normal drilling operation, lateral runoff of said drill steel during rotation thereof as it passes through said bore imparting rotation to said sleeve so that said bearings take the lateral load.

2. The combination of claim 1 in which said sleeve is formed with a lower end projecting axially beyond the adjacent end of the base, and including an upwardly and outwardly inclined deflecting surface formed on said lower end and covering the annular space between the base and the sleeve for deflecting air and particles away from said annular space.

3. In combination with top drive rotary drill steel for use in drilling mine shafts or blast holes in earth formations, an idler guide comprising a base having a passage of circular cross-section extending therethrough and defined by a cylindrical wall and adapted to be carried by a support, an internal sleeve rotatably mounted by bearing means within the base circular passage and slightly spaced from the defining wall thereof to form a small annular clearance space therebetween, said sleeve having an axial bore therethrough for unimpeded rotation and sliding passage of said drill steel therein during a normal drilling operation, and means for preventing dirt and particles from entering the clearance space, said last-mentioned means comprising a lower end of said sleeve projecting axially beyond the adjacent end of said base, and an upwardly and outwardly inclined deflecting surface formed on said lower end of said sleeve for deflecting the dirt and particles away from said clearance space.

* * * * *